Patented May 15, 1951

2,553,239

UNITED STATES PATENT OFFICE 2,553,239

PROCESS FOR THE PRODUCTION OF SELECTIVELY ACTING BLEACHING POWDERS, CATALYSTS, AND RELATED PRODUCTS ON THE BASIS OF CLAYS CAPABLE OF ACTIVATION

Aage Christiansen, Riisskov, near Aarhus, Denmark

No Drawing. Application November 5, 1946, Serial No. 707,892. In Denmark August 17, 1946

5 Claims. (Cl. 252—450)

A distinction is made between two groups of adsorbent substances containing silicic acid, viz one group comprising substances as consist of practically pure silicic acid that may be produced either by chemical precipitation, as for instance silica gel, or by a complete liberation of the silicic acid from silicates of natural origin by means of mineral acids.

It is characteristic of such products of silicic acid that they are soluble in diluted caustic sodium lye, and that they are practically not attacked by the ordinary acids.

To the second group belong partly the active silicates of natural origin, for instance fuller's earth, partly the activated, selectively adsorbing products manufactured by a relatively gentle treatment with mineral acids of the so-called activatable hydrous silicates (containing water in the molecule), for instance activated bleaching powders of the montmorillonite type.

It is characteristic of this group of adsorbent substances that they contain an essential part of the bases present in the raw material—and these contents are adapted to the nature of the raw material and the application of the end product.

As distinct from the first group of pure silicic acid products, this latter group of adsorbents is to a special degree adapted for the bleaching of liquid substances, such as vegetable and animal oils and fats, waxes, mineral oils, aqueous solutions, and for the purification of various substances, such as sulphur. Furthermore, they may be employed as catalysts, for instance by cracking-processes, and also for other processes where a certain surface activity is required.

The present invention exclusively relates to the products belonging to the latter group, manufactured from silicates capable of activation.

It is well known that the silicic acids mentioned in the first group may be treated with ether, alcohol, water, ammonia or carbon disulphide whereby they will become especially adapted for the adsorption of gaseous refrigerants, and also for the employment as fillers in caoutchouc.

Further it is known how to manufacture selectively adsorbing bleaching powders, catalysts, and related products from numerous sorts of clay, such as bentonite, montmorillonite or sedimentary clays, by treating them with mineral acids, for instance sulphuric acid or hydrochloric acid, so that only a limited quantity of the bases present in the raw material is removed, while the part of it, which is necessary for the good and intended effects of the end product, is left. Likewise it is known how to wash out the surplus of acid and the salts formed, by means of water, and finally to remove the loosely bound water by simple drying.

It has now surprisingly proved that this desiccation is decisively detrimental to the qualities of the end product, as the large surface of the acid-treated product, its porous character respectively, is lost to a decisive degree owing to the sintering occurring by the evaporation of the loosely bound water. The subsequent fine grinding will only to some degree remedy the detriment caused.

This decisive damage, as caused by the dehydration of the loosely bound water from the acid-treated and washed substance is overcome, according to the invention, by the removal of the water without evaporation, as the loosely bound water is removed by extraction with volatile water solvents, such as alcohols, acetone, or the like.

The theory that an agglutination is effected by the direct evaporation of the loosely bound water, is supported by the fact that the liter-weight of the directly dried product is essentially higher—with certain sorts of clay up to twice as high—than the liter-weight of the substance dehydrated with a water solvent. Likewise, the substance dehydrated with a water solvent is of a loose structure contrary to the first-mentioned, which, in the case of certain sorts of clay, may be as hard as stone.

The loosely bound water must practically be completely removed in order to attain the highest degree of quality.

In order to obtain an essential improvement of the product, the last effluent has to contain at least 80% of the water solvent.

Previous to the dehydration with the water solvents a delicate, partial evaporation of the water in the acid-treated and washed product may be performed without causing any damage. In this way it will be possible to reduce the consumption of the water solvents. The said, partial evaporation, which, for instance, may be performed through blowing-off with air or steam, must be performed only down to a limit corresponding to the properties of the material in question, as any evaporation down to agglutination must be avoided.

Extraction of water from the acid-activated and washed substance by means of water solvents, will give maximum effect, when the dehydration is performed on a substance treated with a relatively small quantity of acid of low concentration, whereby essential quantities of bases present will remain undissolved, while the effect will entirely fail if the water solvent is applied to a substance treated with such an amount of acid as will extract the total quantity of base and thus isolate the silicic acid.

For the illustration of this contention the following extreme examples are given:

10 parts by weight of a suitable sort of clay was boiled for 20 hours with 400 parts by weight of a 2.5% solution of hydrochloric acid. After the acid-boiling and washing and simple drying by evaporation a product was obtained which lacked any bleaching power on neutralized soya bean oil. When the water however was removed from the acid-treated and washed substance by means of a water solvent, for instance ethyl alcohol, and the latter was removed by evaporation, a product was obtained capable of bleaching the same oil under the same conditions to such a degree that 78% of the colour of the oil was absorbed by the powder.

By another experiment 10 parts by weight of the same clay was boiled for 40 hours with 100 parts by weight of a 10% solution of sulphuric acid. After washing with water and drying by evaporation, a substance that lacked any bleaching power, was obtained, and no bleaching power was created by dehydration by means of water solvents.

Obviously, together with the dehydration of the loosely bound water from the acid-treated and washed substance by means of water solvents, there also occurs an extraction of such substances, as for instance humus-like compounds soluble in the water solvent in question, and which substances have been present in the raw material and which by the acid treatment are made more easily accessible for solvents. The removal of such substances further increases the efficiency and applicability of the end product.

Products made according to the invention are exceedingly active, quick working, and their keeping properties are very great.

The removal of water can in practice be done either by dehydration with a volatile water solvent in filters, such as filter presses, vacuum filters, centrifuges or drum filters provided with washing devices, or by extraction of the water in extraction equipments.

The easiest process is to use filter presses provided with washing devices. The substance activated by the acid treatment, is formed into cakes in the filter presses, through which—after watering out the surplus of acids and the salts—the possible heated water-solvent is pumped through the cakes until practically all water has been removed from the filter cakes, in which the water now is replaced by the water-solvent, which—after the filter cakes have been removed from the filter—can be removed by evaporation in a closed heating snake or drying drum, drying belt or in other suitable apparatuses, from which the vapours of the water-solvent are led to a condenser through a device for retention of dust.

Evaporation of the water solvent can be effected by means of vacuum in the apparatuses mentioned.

The filter presses may suitably be worked in series, and the water solvent used in counterflow, thereby enabling the water solvent to dissolve as much water as possible before it is taken out of the system to be separated from the water by distillation.

The use of closed drum filters fitted with washing devices for the extracting agent, is more rational than the use of filter presses, in which it is difficult to obtain the necessary tightness, and there must be reckoned with a loss of the volatile water solvent at the removal of the filter cakes from the filters when the dehydration is finished.

When closed drum filters are used in the process, the acid-treated and washed aqueous substance which has been deposited in filter presses or scraped off drum filters, may be mixed with a suitable quantity of the water solvent. The mixture is carried to a closed drum filter on which it is sufficiently washed with the possibly heated water solvent. The substance containing a reduced quantity of water, may be scraped off, and remixed with a possibly heated fresh portion of the water solvent and then treated on another drum filter, where it is further washed until practically all water has been removed.

The less concentrated solution of water in the water solvent from the second drum filter may be used for washing the product on the first drum filter. The dehydrated, scraped-off substance is carried to a closed heating snake or drying drum, from which the evaporated, volatile water solvent is taken to a condenser through a suitable dust filter.

The dehydration of the acid-treated and washed substance may—as mentioned—also be executed by means of extraction.

For the technical performance of this process it is, according to the invention, expedient before dehydration by means of the water solvent, to make the substance cohesively solid, for instance, as obtained in filter presses. The material from such a filter may, for instance, be formed into shapes suitable for extraction, for instance in brick presses, or other suitable moulding machines. According to the invention it is important not to stir the substance while it remains in the extraction containers. The extraction itself may be effected by well-known principles of extraction, for instance, continuously or discontinuously and, for instance, according to the counterflow principle, or the counterflow and uniflow principle. The extraction should preferably take place in containers kept filled with liquids, so that direct spraying of the extracting agent on the material is avoided, as far as possible, to prevent the mass reposing in the containers from forming a suspension.

The product from which the water and water-solvent has been removed, is ground and screened in the normal way.

*Example A*

100 parts by weight of clay of Danish origin (with a water content of 34%) was mixed with 400 parts by weight of water, after which 40 parts by weight of concentrated sulphuric acid was added.

The mixture was boiled for eight hours and the evaporated water replaced.

Samples were drawn every second hour.

After a thorough washing the water was removed from these samples, partly by simple drying, partly by means of a water-solvent in this instance ethyl alcohol. The efficiency of the end product when applied to neutralized soya bean oil, was ascertained, and the bleaching efficiency expressed in terms of colour percentage removed.

Powder at the rate of 0.3% of the weight of the oil was added, and while being stirred, the oil was heated to 90° C. in the course of half an hour.

| Boiling period in hours | 2 | 4 | 6 | 8 |
|---|---|---|---|---|
|  | Bleaching effect expressed in terms of color percentage removed ||||
| Water removed by drying | +20 | 0 | 10 | 22 |
| Water removed by extraction with ethyl alcohol | 40 | 58 | 68 | 69 |

*Example B*

100 parts by weight of an American clay (with a water content of 15%) was mixed with: 400 parts by weight of water, after which 60 parts by weight of concentrated sulphuric acid was added.

The mixture was boiled and samples were drawn, treated, and tested as shown in Example A.

| Boiling period in hours | 2 | 4 | 6 | 8 |
|---|---|---|---|---|
|  | Bleaching effect expressed in terms of color percentage removed ||||
| Water removed by drying | 2 | 17 | 28 | 36 |
| Water removed by extraction with ethyl alcohol | 46 | 64 | 68 | 71 |

Having thus described my invention, what I claim is:

1. Process for activating and improving the absorptive properties of a de-colorizing earth of the montmorillonite group of clays, including the steps of treating the earth with a relatively dilute mineral acid, whereby only a portion of the bases is removed, and there is left water combined with the earth, washing the earth to remove substantially all the acid, pre-drying the earth at a temperature not substantially greater than 220° F., removing from the washed earth the remaining water, by extracting the earth with a volatile water solvent of relatively high strength, until a major portion of the water has been substituted by the volatile water solvent, and then removing the volatile solvent at a temperature not materially in excess of 220° F.

2. Process according to claim 1, in which the earth, after washing with water, and before treatment with the volatile solvent, is filtered, and the filter cake is treated with said volatile solvent.

3. Process according to claim 2, in which the said filter cake is kept in compact form during said extraction with said solvent, whereby substitution of said solvent for the water is promoted.

4. Process according to claim 1, in which the volatile water solvent is an alcohol.

5. Process according to claim 1, in which the volatile water solvent is acetone.

AAGE CHRISTIANSEN.

REFERENCES CITED

The following references are of record in the file of this patent:

UNITED STATES PATENTS

| Number | Name | Date |
|---|---|---|
| 1,579,326 | Kauffman | Apr. 6, 1926 |
| 1,731,702 | Black | Oct. 15, 1929 |
| 1,813,272 | Biltz | July 7, 1931 |
| 1,963,818 | Wright | June 19, 1934 |
| 2,249,767 | Kistler | July 22, 1941 |
| 2,316,241 | Heimann | Apr. 13, 1943 |
| 2,375,641 | Garrison | May 8, 1945 |

OTHER REFERENCES

"Organogels of Silicic Acid" by B. S. Neuhausen and W. A. Patrick. Published in J. Chem. Soc., vol. 43 (1921) pages 1844–1846.